Figure 1:
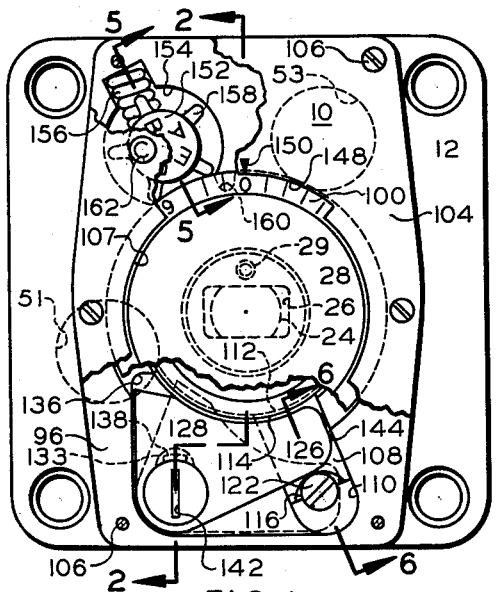

March 26, 1963  G. F. ELSTON ETAL  3,082,787
THERMAL RESPONSIVE THROTTLE VALVE
Filed June 9, 1958

*INVENTORS*
GEORGE F. ELSTON
GERALD F. TESS
LAURENCE J. EVANS
BY Van Meter and George
ATTORNEYS 3,082,787
THERMAL RESPONSIVE THROTTLE VALVE
George F. Elston, Birmingham, and Gerald F. Tess, Roseville, Mich., and Laurence J. Evans, Denver, Colo., assignors to Vickers Incorporated, Detroit, Mich., a corporation of Michigan
Filed June 9, 1958, Ser. No. 740,803
2 Claims. (Cl. 137—468)

This invention relates to power transmissions, and is particularly applicable to those of the type comprising two or more fluid pressure energy translating devices, one of which may function as a pump and another as a fluid motor.

More particularly the invention is concerned with an improved flow regulating valve. Flow regulating valves have an important use in hydraulic power transmission systems, such as in systems for driving machine tools wherein they serve to accurately regulate the speed of a fluid motor for driving the machine tool and to maintain such speed constant.

One type of flow regulating valve in common use has incorporated therein an adjustable throttle and a pressure compensating valve. The compensating valve is responsive to pressure changes ahead of or beyond the throttle for maintaining a substantially constant pressure drop across the throttle and thus the flow therethrough at a constant rate for any given setting of the throttle. However, for extremely accurate feed control of the motor, adjustments to the throttle have to be made because the rate at which the oil flows through the throttle opening depends not only on the pressure, but also the viscosity of the oil. Although the conventional pressure compensating valve is adapted to compensate for changes in load to maintain the flow through the throttle constant, the viscosity of the oil in the system will vary with temperature changes. Thus, as the oil in the system becomes heated, the viscosity of the oil will decrease and for a given pressure in the system, the flow will increase through the throttle.

Another disadvantage of prior flow regulating valves has been the lack of tamper-proof means for preventing the changing of carefully preselected throttle settings. The throttle setting to give a particular feed rate of a machine tool is carefully calculated, not only to provide a good grade of finished product, but also to conserve tool life. However, some operators of machine tools for various reasons will adjust the throttle setting to increase the feed rate of the machine tool beyond recommended limits, and in many cases the cutting tool is ruined. In some cases where the throttle setting was locked, machine operators have been known to shut off oil coolers to lower the viscosity of the oil and thus increase the feed rate beyond safe limits.

It is, therefore, an object of this invention to provide an improved flow regulating valve with features alleviating the disadvantages previously recited.

It is another object of this invention to provide an improved temperature compensated, flow regulating valve.

It is a further object of this invention to provide an improved, combined pressure compensating and temperature compensating, flow regulating valve.

It is still another object of this invention to provide an improved flow regulating valve with an adjustable throttle, the effective cross-sectional area of the opening of which will increase and decrease, respectively, with decreases and increases of temperature of the fluid flowing therethrough.

It is still another object of this invention to provide an improved flow regulating valve having an adjustable throttle, which can be locked to a desired setting.

It is still another object of this invention to provide an improved flow regulating valve having a dial operated throttle for adjusting the opening of the throttle, the dial of which can be locked to a desired tamper-proof setting.

It is still another object of this invention to provide an improved flow regulating valve having a dial operated adjustable throttle, the setting of which can be locked, but which is automatically adjustable in response to temperature variations of the liquid in the system flowing through said valve.

It is a further object of this invention to provide a flow regulating valve having an adjustable throttle which may be locked to a desired setting and having an improved indicia arrangement for clearly indicating the setting of the throttle.

It is still another object of this invention to provide an improved flow regulating valve which is simple in construction, efficient in operation and which is relatively inexpensive to manufacture.

Further objects and advantages of the present invention will be apparent from the following description, reference being had to the accompanying drawings wherein a preferred form of the present invention is clearly shown.

Figure 2:
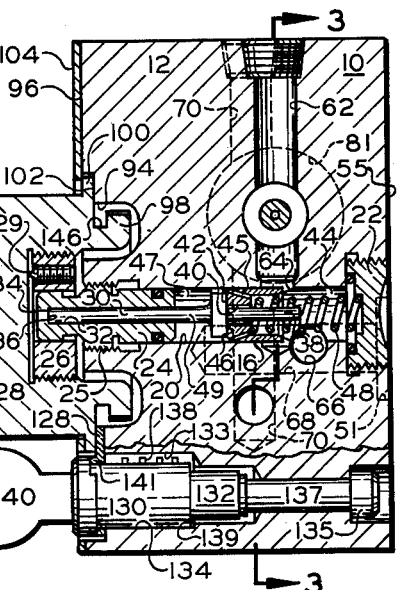
Figure 3:
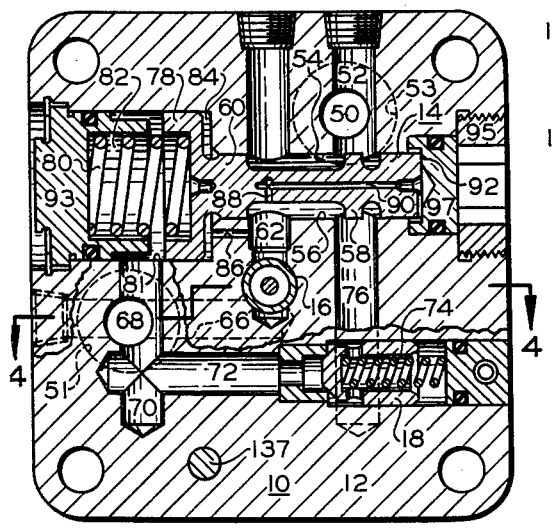
Figures 5, 6:
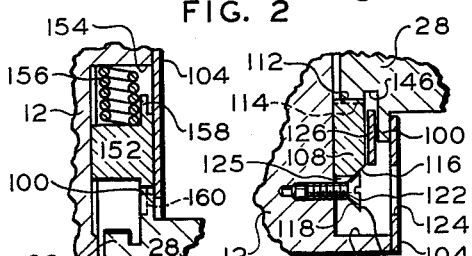
Figure 4:
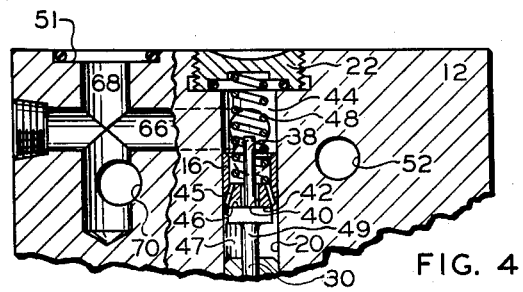

In the drawings:
FIGURE 1 is a front elevation view, partially in section, of a preferred form of the present invention.
FIGURE 2 is a sectional view taken on line 2—2 of FIGURE 1.
FIGURE 3 is a sectional view taken on line 3—3 of FIGURE 2.
FIGURE 4 is a partial, sectional view taken on line 4—4 of FIGURE 3.
FIGURE 5 is a partial, sectional view taken on line 5—5 of FIGURE 1.
FIGURE 6 is a partial, sectional view taken on line 6—6 of FIGURE 1.

Referring now to FIGURES 1, 2 and 3 of the drawings, there is illustrated a flow regulating valve, indicated generally by the numeral 10, comprising a body 12 having mounted therein a pressure compensating throttle valve 14, a throttle valve 16 in series with the throttle 14 and comprising a hollow piston, and a check valve 18.

The throttle valve 16 is shiftably mounted in a throttle bore 20 which extends completely through the body 12 from the front to the rear thereof. The bore 20 is closed at the rear of the body by a threaded closure member 22, and at the front face of the body by a throttle adjusting screw member 24 threaded into the throttle bore at 25. The screw member 24 is keyed to an insert member 26 threaded into a dial 28 and locked thereto by a set screw 29. The end of the screw member is free to slide in the insert member 26, and an end clearance is provided between the screw member and dial for that purpose.

A rod member 30 extends into a bore 32 of the adjusting member 24 with an end surface 34 of the rod adapted to abut a surface 36 forming the closed end of bore 32. The opposite end of the rod 30, which is indicated in FIGURE 4 by the numeral 38, extends through a hole 40 formed in the closed end 42 of the throttle valve 16 into the hollow portion thereof and slightly beyond, where it is exposed to flow through a throttle chamber 44 formed in the throttle bore 20 between the open end of the throttle valve 16 and closure member 22.

The rod 30 is provided with a flange forming a seat 46 upon which the closed end surface 42 of the throttle valve 16 rests so that when the adjusting member 24 is screwed inwardly the throttle valve 16 is moved inwardly into the bore 20 against the bias of a spring 48 adapted to resiliently load the throttle valve 16 against the seat 46. The spring 48 is mounted in the throttle chamber 44 and extends into the hollow portion of the throttle valve 16. When the adjusting member is screwed outwardly, the spring 48 will shift the throttle valve 16 to a new adjusted throttle setting, the rod member also being shifted with the throttle valve. Most important, when the rod expands or contracts because of fluid temperature increases or decreases, the throttle will also be shifted inwardly or outwardly to compensate for the variations in temperature.

A plurality of holes 45 are constructed through the closed end of the throttle valve 16, also shown in FIGURE 4, for connecting the throttle chamber 44 to a chamber 47 formed in the bore 20 between the throttle valve 16 and the adjusting member 24. A portion 49 of the rod 30, located in the chamber 47, is thus also exposed to fluid, the temperature of which changes with that flowing through the inlet chamber 44.

In the device disclosed the rod member 30 is made of an aluminum alloy, the throttle valve 16 and the adjusting screw 24 of steel, and the body of cast iron. The aluminum alloy has a temperature expansion coefficient about double that of the iron or steel. The rod may be made, however, of aluminum or other metals or alloys having temperature expansion coefficient characteristics rendering them suitable for the purposes described. As the fluid in the hydraulic system, usually a good grade of oil, becomes heated, the aluminum alloy rod will expand with corresponding temperature increases of the heated oil and the flange will shift the throttle valve to adjust the throttle setting of the device to compensae for the temperature increases. When the system is at rest and the temperature of the fluid decreases, the rod will contract to readjust or increase the throttle opening to a setting commensurate with the fluid viscosity change.

Referring now to the flow passage construction of the device, inlet and outlet external connection ports 53 and 51, respectively, are formed in the rear surface 55 of the body 12. Inlet flow to the external inlet connection port 53 is conducted by an inlet passage 50 to a branch inlet passage 52 leading to the compensating valve. The branch inlet passage 52 opens to an inlet chamber 54, formed in a bore 56 in which the compensating valve 14 is mounted, between a throttling land or valve 58 of the compensating valve and a spaced apart land 60.

Another branch inlet passage 62 leads from the compensating valve inlet chamber 54 to the downstream throttle chamber 44 formed in the throttle bore 20. Passage 62 opens laterally or transversely to the throttle chamber 44 and is controlled by throttle valve 16, said opening being indicated in FIGURE 2 by the numeral 64. A sharp edged orifice is thus formed by the leading edge of throttle valve 16 and the edge of the wall opening to the throttle bore. An outlet passage 66, offset from passage 62, leads from the side of throttle chamber 44 to a branch outlet passage 68 leading to the external connection outlet port 51 in face 55 of the body 12.

It should be noted that the temperature sensing extension 38 of rod 30 passes through the throttle valve 16 so as to be directly impinged upon by fluid which passes through the orifice opening 64. Thus, any change in temperature in the metered fluid is immediately reflected in a temperature change in the extension 38. Due to the high heat conductivity of the rod, an almost immediate temperature change takes place in the working portion of rod 30, that is between abutment 36 and abutment 46, which results in rapid response repositioning of throttle valve 16, as a function of working fluid temperature change.

For the purpose of providing unregulated reverse flow from the outlet passage to the inlet passage, a branch passage 70 is provided which connects the outlet port 51 and outlet passage 68 to a passage 72 leading to the check valve 18. The check valve 18 may be opened by flow from the outlet side to the inlet side of the device against the slight bias of a spring 74 to permit flow through a passage 76 leading to the compensating valve bore 56 where it flows by means of passages 52 and 50 to the external connection inlet port 53 of the device. When flow is from the inlet passage to the outlet passage, flow from passage 76 to passage 72 is blocked by the check valve 18.

Referring now to the compensating valve 14, an operating piston 78 for the same is provided which is resiliently biased to shift the valve land 58 to the fully open position shown by a spring 80 mounted in an enlarged portion 81 of bore 56 which forms a chamber 82 at the spring loaded side of the operating piston 78. Pressure beyond the throttle valve 16 is adapted to be transmitted to the chamber 82, and thus to the spring loaded side of the compensating valve operating piston 78 by means of the passages 66, 68 and 70, as shown in FIGURES 2 and 3.

A chamber 84 is formed in the enlarged portion 81 of the bore 56 on the opposite side of operating piston 78, to which pressure ahead of the throttle 16 is adapted to be transmitted by means of a passage 86 which is connected to the passage 62 leading to the upstream side of throttle 16. For the purpose of providing balanced operating areas for the operating piston 78, a transverse passage 88 and longitudinal passage 90 are constructed in the compensating valve for also connecting passage 62 ahead of throttle 16 to an underside effective area of the compensating valve, indicated by the numeral 92. The compensating valve bore 56 is closed at the enlarged bore portion thereof by a closure member 93 and at its opposite end by a closure member 95 which retains a seat member 97 for the compensating valve against a shoulder formed in the bore 56.

The position of valve land 58 of the compensating valve is modulated by the pressure responsive operating piston 78 for controlling the opening of passage 52 to the chamber 54. Flow in excess of the regulated amount is normally by-passed by valve means for this purpose, such as a pressure responsive relief valve, incorporated in the hydraulic system. The compensating valve 14 thus functions as a pressure responsive throttle to maintain a constant pressure drop, as determined by the bias of spring 80, across the throttle opening 64, and thus maintains the flow across the throttle 16 constant for any given setting of the throttle 16.

Referring now to the throttle dial and locking arrangement therefor, the body 12 is provided with a stepped bore 94 extending from the front face 96 of the body and within which is mounted an under portion 98 of the dial having a flange 100 adapted to rest on a shoulder 102 of the stepped bore. A cover plate 104, which is maintained on the front face 96 of the body 12 by screws 106, is centrally perforated, indicated by the numeral 107 in FIGURE 1, so that the dial may extend therethrough and so that the surface area of the plate immediately surrounding the perforation covers the flange and prevents the dial from lifting from the body.

The locking arrangement comprises a pawl 108 mounted in a milled-out portion 110 in the front of the body and which is provided with serrations 112 at its inner end. The pawl is adapted to be shifted into engagement with mating serrations 114 located on the under portion of the dial, after proper adjustment of the throttle has been made and then locked to prevent rotation of the dial. For this purpose an inner angular surface 116 of the pawl, opposite the serrated end of the pawl, is engaged by a tapered portion 118 of a locking screw 120, shown in FIGURE 6, which when threaded into the body forces the pawl against the dial serrations by a wedging action. The head 122 of the screw may be engaged, for unlocking and locking the pawl, through an access hole 124 formed in the plate. When a throttle adjustment is to be made the screw 120 is partially withdrawn and the pawl 108 drops permitting the mating pawl and dial serrations to disengage to permit rotation of the dial for adjusting the throttle. A clearance, indicated by the numeral 125, is provided between the inner end of the pawl and the screw, permitting the pawl to drop and thus disengage the mating serrations.

In order to prevent tampering with the locking screw 120 and thus permit changing of carefully preselected throttle settings, the access hole 124 is closed by an end portion 126 of an arm 128, rotatable to and locked in the closed position as shown in dotted lines in FIGURE 1 by means of a cylinder 130 of a lock assembly 132 rotatably mounted in a stepped bore 134 extending completely through the body from front to rear thereof. The lock assembly is maintained in the bore 134 by means of a head 135 of a screw 137 threaded into the cylinder which is adapted to loosely abut a shoulder 139 of the stepped bore and by cooperating shoulders formed in the stepped bore and on the cylinder. The arm 128 is mounted in a recessed portion 136 in the front of the body and may be fastened to the cylinder in any suitable manner, such as by being keyed to a slot in the head end of the cylinder, indicated generally by the numeral 141 in FIGURE 2, so as to be rotatable by the cylinder 130. The cylinder 130 in the locked position is prevented from rotation by a plurality of spring pressed plungers or tumblers 138, shown in FIGURE 2, which for the purposes of illustration have been shown in the extended position. The plungers extend into an offset drilled hole 133 of bore 134 also shown in FIGURE 1 to prevent dial rotation. It should be understood, however, that when a key 140 is inserted in a keyhole slot 142 of the lock, the plungers are released.

With the key 140 inserted in the keyhole slot 142, the plungers 138 are released from the hole 133 and turning of the key rotates the cylinder, which in turn rotates the arm 128 so that the arm portion 126 uncovers the access hole 124. In order to prevent lifting of the dial by removal of the cover plate so that access can be had to the adjusting member 24, the outer periphery 144 of the projecting portion 126 of the arm 128 fits into a groove 146 located in the under portion of the dial directly beneath the flange and prevents lifting of the dial (FIGURES 2 and 6). The cylinder must first be rotated to shift the outer periphery 144 of the arm portion 126 from the groove 146 before the dial can be lifted.

Referring now to the improved dial throttle indicia arrangement for properly indicating the adjustment setting of the throttle, the outer face of the dial flange 100 is provided with numerals from 0–9 with line markings inbetween, some of which appear through an arcuately shaped cutout portion 148 of the plate below a centrally located indicating arrow 150 on the outer surface of the plate.

The adjusting member 24 has to be completely rotated in the threaded portion of its body mounting bore several times in order to permit the throttle to shift axially from the "0" or closed position to its maximum throttle opening. Thus, in the device disclosed which is designed for a maximum rating of 1000 cubic inches per minute, it would take about 3.3 turns of the adjusting member to obtain 1000 cubic inches or approximately 0.85 cubic inch per each degree of rotation. For the purpose of indicating the number of turns of the adjusting member, a small rotor 152 is provided with letters thereon. The rotor 152 is rotatably mounted in a recess 154 in the front face of the body 12 and is free to slide slightly vertically toward the dial flange, being biased in that direction by a spring 156 (FIGURES 1 and 5). A plurality of spaced apart teeth 158 extend from the rotor which are adapted to successively engage a groove 160 in the flange. As the dial is turned, the rotor will be turned and a letter indicating the number of turns of the dial will appear through a hole 162 in the plate. Thus, the letter "B" represents one complete turn of the dial, which together with the numeral markings previously explained, will indicate a particular opening of the throttle to provide a predetermined flow rate. The letter "C" indicates two complete turns of the dial, which together with the numerals appearing through the arcuate slot would indicate another more fully open setting of the throttle with a higher flow rate. When the rotor is turned to a setting "C," for example, and the dial is continued to be rotated, the tooth responsible for the actuation of the rotor, which had been impressed in the groove 160, will ride out of the groove on top of the flange. The rotor will not be actuated again until another complete turn of the dial has been made, at which time the next adjacent tooth will be pressed into the groove 160 to rotate the rotor for bringing the next letter into view through the sight hole 162 to indicate a still more fully opened setting of the throttle.

There is thus provided a flow regulating valve which will accurately control the flow rate in the hydraulic system regardless of pressure fluctuations or fluid viscosity changes due to temperature variations. Flow across the opening 64 controlled by the throttle 16 would, without the pressure compensating valve, vary with pressure fluctuations caused, for example, by changes in load on a hydraulic motor in the system. However, the pressure drop across the throttle 16, for any given setting thereof, is maintained constant by the pressure compensating valve 14 and, disregarding changes in viscosity of the liquid medium in the system, the flow across the throttle 16 will remain substantially constant.

In order to compensate for changes in viscosity of the fluid medium due to variations in the temperature thereof, a temperature compensated throttle is provided. The throttle 16 is first adjusted to a desired flow rating and then locked. As the temperature of the fluid flowing through the flow regulating valve increases, the rod member 30 expands because a portion 38 of the rod 30 is exposed to flow across the throttle in the chamber 44 from the throttle opening 64 to the passage 66. In addition, any temperature increase of the liquid medium is transmitted by the holes 45 in the valve 16 from the throttle inlet chamber 44 to the chamber 47, wherein portion 49 of the rod member is exposed. As the coefficient of expansion of the aluminum alloy rod is much greater than the cast iron body within which the throttle bore is formed and of the steel adjusting screw and throttle piston, the rod member 30 will expand, which shifts the flange or seat 46 inwardly, thus shifting the throttle 16 against the slight resistance of spring 48 to more fully close the throttle opening 64. Thus, the pressure drop across the throttle opening will remain the same but the size of the throttle opening will be decreased to compensate for the fluid viscosity change due to temperature increases. If, for any reason, the temperature of the fluid decreases, such as when the system is at rest, the rod member 30 will contract with said temperature decreases and the spring 38 will shift the throttle valve 16 to increase the size of the throttle opening 64 to compensate for the change in fluid viscosity due to the temperature decrease.

There is also provided a tamper-proof locking of the throttle setting through the medium of the locking pawl 108, which can only be released from its locked position with the dial serrations 114 by means of locking screw 120. Access to the locking screw 120 can only be had through the access hole 124 in the plate 104 which, once the throttle has been adjusted, is covered by an end portion 126 of the arm 128 which is locked to a position closing the access hole by lock assembly 132. A special key 140 must first be inserted in the keyhole slot 142 of cylinder 130 to release the tumblers 138 from the drilled hole 133, which will unlock the cylinder to permit rotation of the same and thus rotation of the arm 128 to uncover the access hole. Removal of the plate 104 will not provide access to the locking screw 120 because the arm portion 126 is locked to a position over the screw.

Removal of the plate 104 from the front of the body will not permit access to the screw member 144 for adjusting the throttle because the dial must first have to be lifted from the adjusting screw 144 and removal of the dial from the body is prevented by the expedient of having the peripheral portion 144 of the arm portion 126 rest in the groove 146 below the flange 100 of the dial. The arm portion 126 must first be rotated away from the dial to remove the peripheral portion thereof from the groove and as previously recited, the arm is locked by the lock assembly to this position.

While the form of embodiment of the invention as herein disclosed constitutes a preferred form, it is to be understood that other forms might be adopted, all coming within the scope of the claims which follow.

What is claimed is as follows:

1. In a fluid flow control valve: a body having a particular coefficient of expansion; means forming a flow passage in the body; a throttle valve element slidably positioned in the passage forming an adjustable restriction to fluid flow through the passage; a temperature compensating rod member having a coefficient of temperature expansion different from that of said body and comprising a throttle valve engaging portion, a temperature sensing portion on one side of said throttle valve engaging portion freely extending into the path of fluid flowing through said restriction, and a working portion on the opposite side of the throttle valve engaging portion to that of the sensing portion and abutting said body; means forming a fluid chamber in which the working portion of the rod member is exposed; and porting means connecting said chamber to the flow passage.

2. In a fluid flow control valve: a body having a particular coefficient of expansion; means forming a flow passage in the body; a throttle valve element slidably positioned in the passage forming an adjustable restriction to fluid flow through the passage; a temperature compensating rod member having a coefficient of temperature expansion different from that of said body and including a flange engaging the throttle valve element, said rod member having a temperature sensing portion on one side of said flange freely extending into the path of fluid flowing through said restriction and a working portion on the opposite side of said flange and abutting said body; means forming a fluid chamber in which a portion of the working portion of the rod member is exposed; and porting means connecting said flow passage to said chamber.

References Cited in the file of this patent

UNITED STATES PATENTS

| | | |
|---|---|---|
| 1,055,307 | Barton | Mar. 11, 1913 |
| 1,813,122 | Moore | July 7, 1931 |
| 1,914,677 | Schultz | June 20, 1933 |
| 2,021,427 | Peo | Nov. 19, 1935 |
| 2,063,621 | Peteler | Dec. 8, 1936 |
| 2,308,944 | Turco | Jan. 19, 1943 |
| 2,310,745 | Parks | Feb. 9, 1943 |
| 2,343,375 | Herman | Mar. 7, 1944 |
| 2,476,720 | Gardiner | July 19, 1949 |
| 2,633,861 | Gardiner | Apr. 7, 1953 |
| 2,658,522 | Coberly | Nov. 10, 1953 |
| 2,854,995 | Lornitzo | Oct. 7, 1958 |
| 2,867,268 | Brown | Jan. 6, 1959 |
| 2,966,170 | Raulins | Dec. 27, 1960 |